April 7, 1925. 1,532,544
H. NEWMAN
ATTACHMENT FOR CAMERAS
Filed Aug. 1, 1922 4 Sheets-Sheet 1
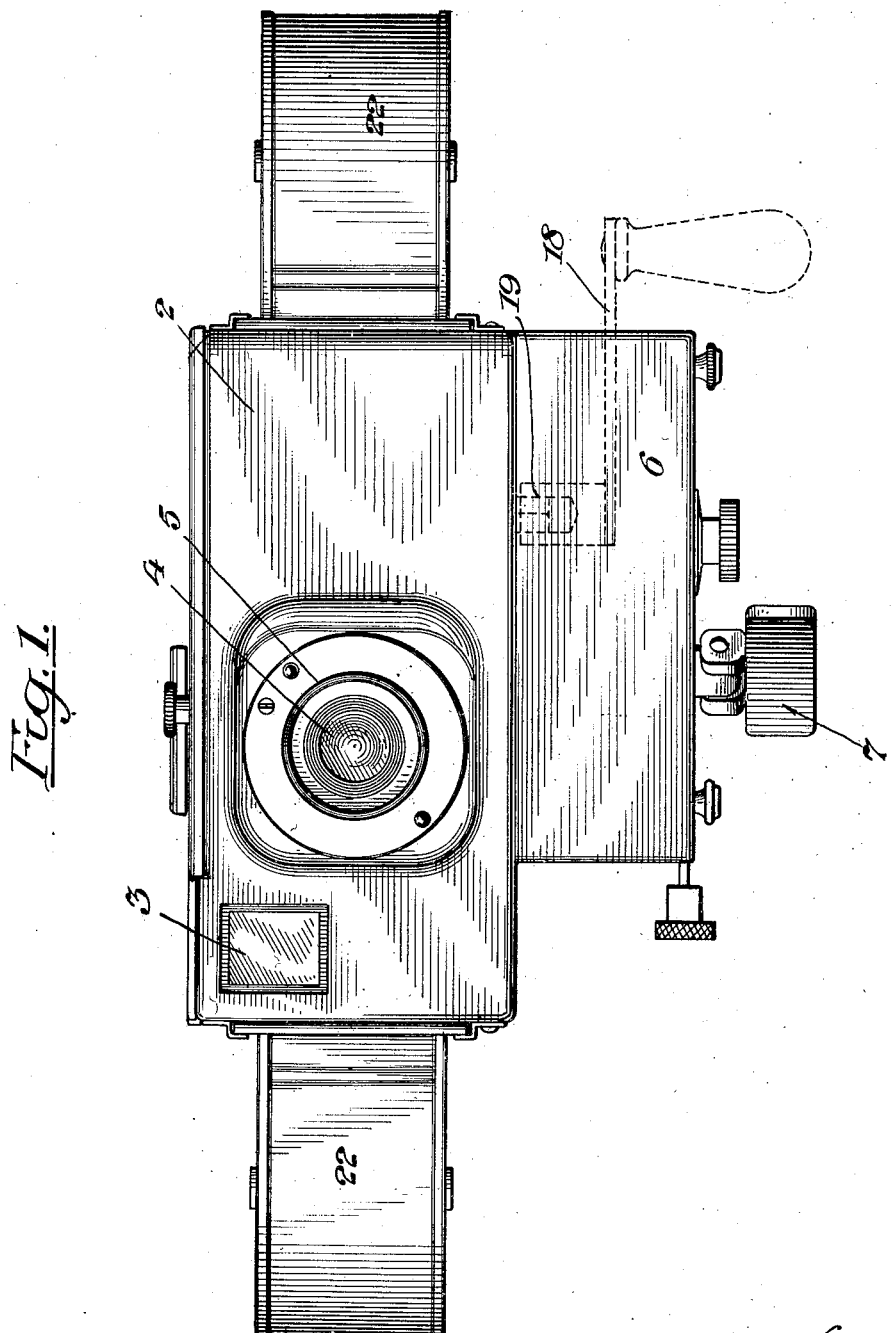

April 7, 1925. 1,532,544
H. NEWMAN
ATTACHMENT FOR CAMERAS
Filed Aug. 1, 1922 4 Sheets-Sheet 2
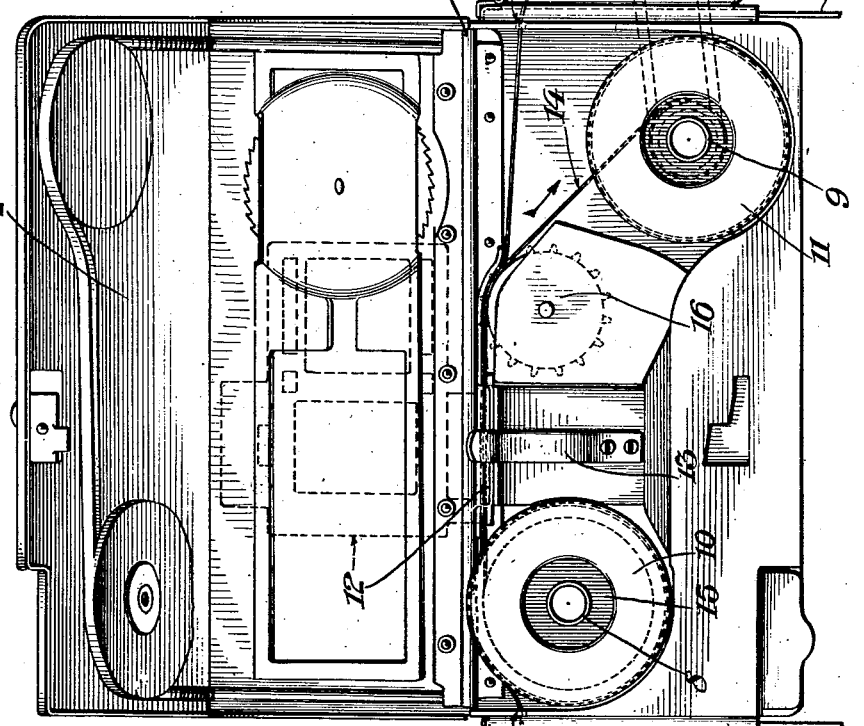
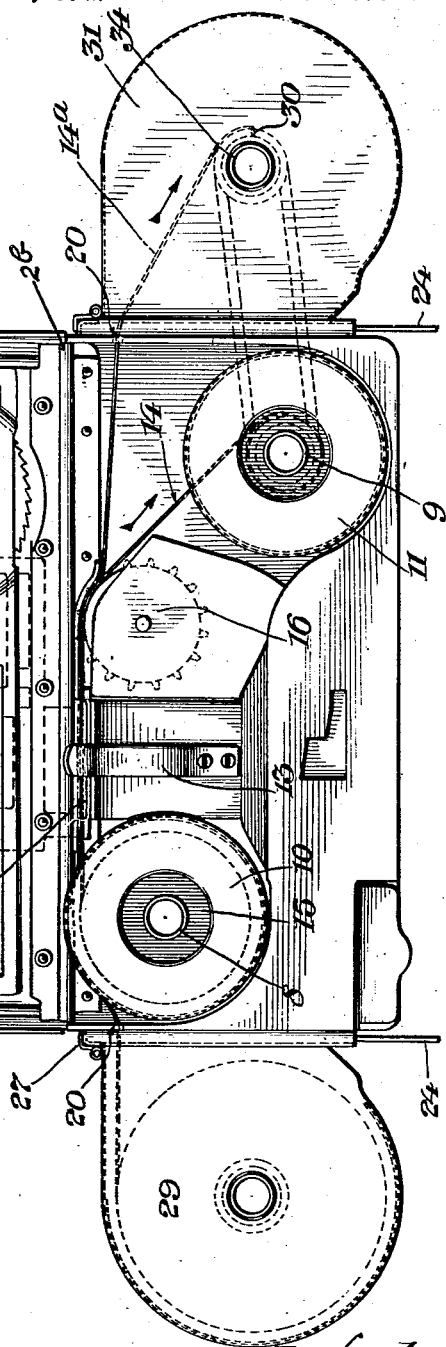

April 7, 1925.  1,532,544
H. NEWMAN
ATTACHMENT FOR CAMERAS
Filed Aug. 1, 1922  4 Sheets-Sheet 3
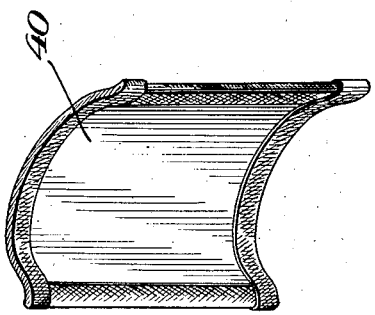
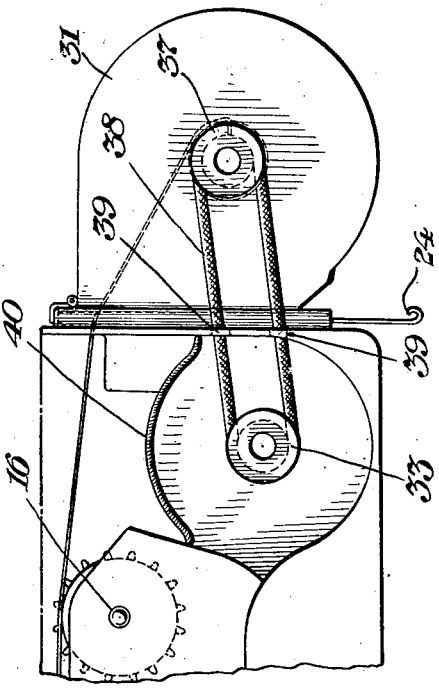
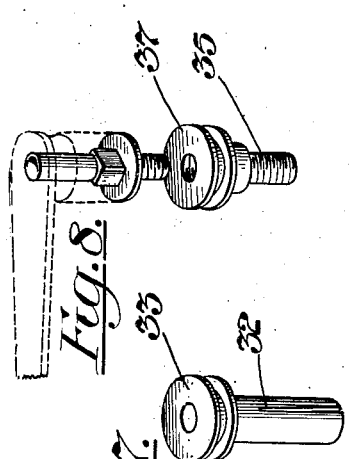
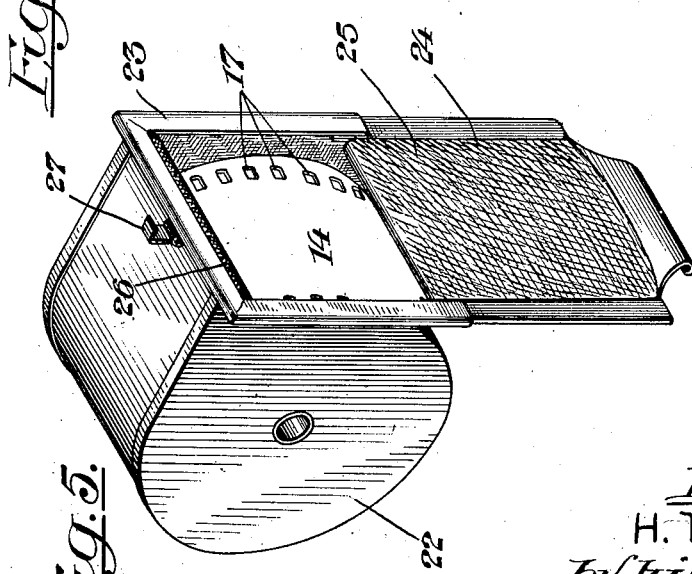
Inventor
H. Newman
by his Attorneys
Weed & Gray April 7, 1925.
H. NEWMAN
ATTACHMENT FOR CAMERAS
Filed Aug. 1, 1922
1,532,544
4 Sheets-Sheet 4
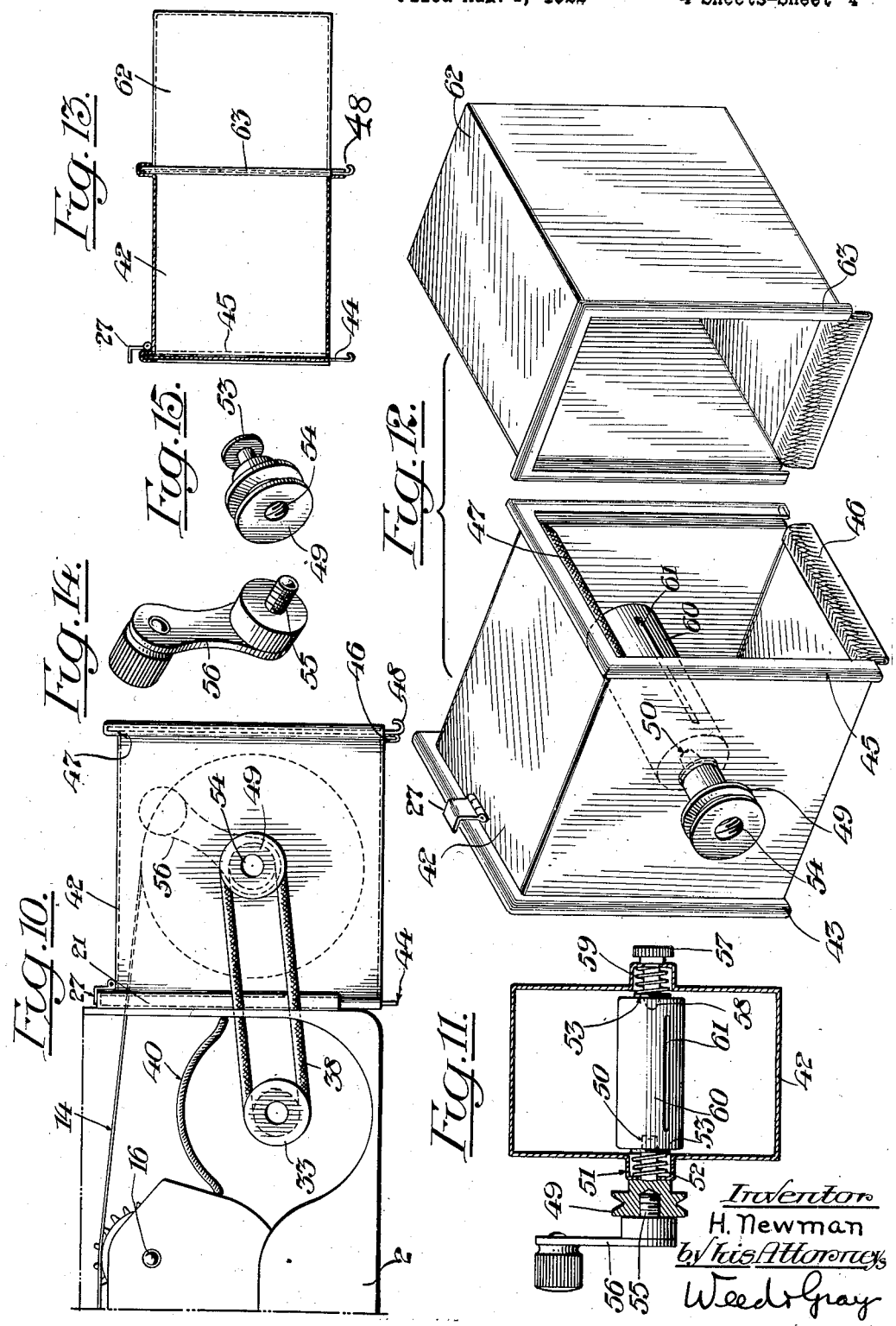

Patented Apr. 7, 1925.

1,532,544

UNITED STATES PATENT OFFICE.

HUGO NEWMAN, OF NEW YORK, N. Y.

ATTACHMENT FOR CAMERAS.

Application filed August 1, 1922. Serial No. 578,863.

*To all whom is may concern:*

Be it known that I, HUGO NEWMAN, a citizen of the United States, residing at New York city, in the county of New York and State of New York, have invented certain new and useful Improvements in Attachments for Cameras, of which the following is a specification.

This invention relates to cameras and attachments therefor, and particularly to motion picture cameras, an object of the invention being to provide improved film magazine mechanism for a camera, adapted to be used in connection with films of varying lengths, whereby the range of use and service of the camera as well as the film carrying capacity thereof, may be materially increased or varied to suit the occasion.

A further object of this invention is to provide an improved magazine attachment for cameras which will not only facilitate the use and operation of the camera, but also may be readily and effectively employed in relation to the mechanism of the camera without any substantial change or modification thereof.

A further object of this invention is to provide feed and take up magazines for the film of the camera attachable to the outside thereof, and which may be loaded and unloaded quickly and easily, the construction being such that the magazines may be used independently with the camera mechanism or in conjunction with the usual interior film magazines for making reprints.

A further object of this invention is to provide a self unloading magazine or film box for a camera. In the present instance the magazine is constructed for quick attachment to the camera and is provided with means for quickly discharging or releasing the reeled film therefrom without necessitating the detachment of the magazine, or the removal or dismounting of any of the parts thereof.

Other objects of this invention will appear in the following description thereof, reference being had to the accompanying drawings forming a part of this specification wherein like reference characters indicate corresponding parts in the several views and wherein Fig. 1 is a plan view of the front of the camera showing one form of my improved attachment in position; Fig. 2 is an elevation showing the back side of the camera with the casing thrown open; Fig. 3 is a fragmentary top plan view with the magazine removed; Fig. 4 is a perspective view of a cover plate for the top or bottom of the camera; Fig. 5 is a perspective view of the form of magazine illustrated in Figs. 1 and 2; Fig. 6 is a fragmentary view illustrating such magazine in position together with the take up mechanism; Fig. 7 is a detail view of a pulley; Fig. 8 is a detail view of a pulley for the take up magazine and also illustrates the manner in which a crank handle may be connected thereto; Fig. 9 is a perspective view of the shield; Fig. 10 is a view similar to Fig. 6 illustrating a modified form of magazine attachment; Fig. 11 is a cross section thereof; Fig. 12 is a perspective view of the take up magazine and a film container adapted to be connected thereto for unloading the film; Fig. 13 is a view illustrating the magazine and film container in position; Fig. 14 is a detail view of the handle; and Fig. 15 is a detail view of the magazine pulley.

Heretofore in hand cameras of various types the film carrying capacity has been limited to a relatively short film length, and after the operator has exposed a given length of film considerable time has been lost in reloading. In practice a film often runs out before a scene has been completed, and where it requires a number of minutes to reload the camera, considerable annoyance and objection result, and often the opportunity of completing the scene is lost. In many hand cameras the film carrying capacity is limited to film lengths of from sixteen to eighteen feet as it has been found impracticable to increase the size of the camera casing for the purpose of carrying larger magazines. Although a hand camera having a magazine adapted to carry for instance a fifty foot film would be adapted for greatly increased range of operations, and the usefulness thereof would be greatly enhanced, yet in view of the necessity of providing a light compact structure having a minimum of bulkiness it has been considered impracticable to build such a camera with a large film capacity. By virtue of the present invention however, increased film capacity is possible and at the same time without any increase in the normal size of the camera. Furthermore as a result of this invention many commercial cameras may be quickly adapted for a variety of operations by equipping the camera with my attachments, which may be accomplished without substantial modification or change in the camera.

Furthermore my improved magazine attachments will not only vary the film capacity as may be desired, but exhausted magazines may more readily and quickly be replaced. Also the magazines are so constructed as to be interchangeable and the magazine which is used for taking up the exposed film may be unloaded quickly and expeditiously without requiring the detachment thereof and without removing any of the parts.

The attachments embodying the present invention are herein shown in connection with the sept cimema camera, but of course it is understood that such adaptation is by way of example as the invention is not limited to any particular style or type of camera but is intended for and capable of wide and extensive use on various standard cameras. The camera herein shown comprises a casing 2 having a part 2$^a$ thereof hinged at 2$^b$ to the main portion of the casing and adapted to be swung open so as to permit access to the interior of the camera. The camera is also provided with the usual finder 3, and lens 4 carried in the lens hood 5. Detachably connected to the side of the casing is a spring box 6 within which is housed a spring motor of any suitable character. A key 7 is provided for winding the spring and power is transmitted therefrom to a sprocket wheel 16, the cogs or teeth of which extend into the perforations 17 in the film 14. When the spring is not used the spring box may be removed and the sprocket wheel 16 operated by hand by means of a handle 18 adapted to be connected to the end of the arbor 19. A pair of axles 8 and 9, which are rotated by the spring, are suitably mounted in the casing over which the usual film boxes 10 and 11 are slipped, the film box 10 carrying the film which is taken up from the sprocket wheel 16 and reeled on a suitable bobbin carried by the take up box 11 and releasably secured to the axle 9 for rotation therewith. The film is fed from the loaded magazine or box 10 beneath a hinged gate 12, which in operation is held in position by means of a gate latch 13. A further detailed description of the camera per se is not deemed necessary herein as the same forms no part of the present invention.

The top and bottom of the casing 2 are each provided with a slot 20 of sufficient width to permit the passage of the film therethrough and a guide framework 21 is secured in any suitable manner at both the top and bottom ends of the casing. The framework forms a guideway permitting the slidable attachment of a film magazine at each end of the casing. These film magazines which are thus adapted for quick detachable connection to the outside of the casing may be of any suitable size and shape, in the present instance two forms being shown by way of example. Referring to Figs. 2, 5, and 6, it will be seen that each film box 22 may comprise a curved housing having an opening at one side thereof which is bounded by a guide frame 23 projecting beyond the side edges of the housing and adapted to slide within the guideways formed by the frame 21. The guide frame 23 is also formed with a guideway within which a slide or closure 24 freely slides. The slide is provided with a plush or other suitable lining 25 and the film box may also be provided with a similar edging 26 so that when the slide is shifted into closed position a light tight joint will be obtained. It will be noted that the guide frame 21 of each film box or magazine may be provided with a suitable hinged catch or latch 27, which is shiftable into position as shown in Fig. 2 so as to hook over the top part 28 of the guide frame 21 thereby preventing the magazine from accidentally becoming displaced.

In the operation of the foregoing mechanism, the loaded magazine which may be termed the feed magazine, indicated at 29 in Fig. 2 is mounted in position and the film is threaded through the slot 20, underneath the gate 12, over the sprocket wheel 16, and is secured at 30 to a bobbin carried in the take-up magazine 31. As seen from Fig. 6, the usual film boxes 10 and 11 may be removed and upon the axle 9 is slipped a sleeve 32 having at its outer end a suitable pulley wheel 33. The axle 34 of the take-up magazine 31 is tapped to permit the attachment of the threaded shank 35 of the pulley wheel 37. These two pulleys 33 and 37 are connected by a suitable belt or strand which is preferably of some flexible resilient material and which passes through a pair of openings 39 in the casing. In order to prevent the admission of any light, a suitable shield 40 edged with plush or other material may be placed in position as shown in Fig. 6. Thus since the axle 9 is driven by the spring motor the same power will be transmitted by the belt and pulley wheels to the axle 34 of the take up magazine, and hence when the spring is running and the film is fed from the magazine 29 for exposure, the film will be taken up by the magazine 31 at the same speed. It will be understood that the loaded magazine 29 is closed by means of the slide 24 when attaching the magazine in position, but when operating the camera the slide may be opened as illustrated in Fig. 5.

It will be noted that the magazines 29 and 31 are preferably interchangeable, and the same may be constructed in varying sizes.

Whereas heretofore the magazines carried interiorly of the camera casing have been limited to an arbitrary film carrying capacity, by virtue of the present invention magazines carrying as much as fifty feet of film or more may be used. A slide 41 may be slipped into position within the guide frame 21 at each end of the camera casing when the magazines are removed. In Fig. 2 the exterior magazine attachments are shown in conjunction with the usual film boxes 10 and 11 for the purpose of making reprints. The film 14ª in this instance passes over the negative 14 carried by the interior film boxes and it will be readily seen that a convenient and facile apparatus is thus provided for making reprints and at the same time without involving any material modification in the camera or any complicated mechanism.

In Figs. 1, 2, 5, and 6, the film magazine attachments have been shown by way of example with a curved housing but it is of course understood that these magazines may be square or rectangular in shape thereby furnishing a stable support upon which the camera may be rested.

In Figs. 10 to 15 inclusive a somewhat modified form of magazine attachment is shown which is so constructed that the magazine may be quickly unloaded without necessitating the detachment of the magazine from the casing. In other words in this construction the important feature of the magazine resides in its self-unloading construction, and the fact that the reels of film may be discharged therefrom without necessitating the removal of the magazine or the dismounting thereof.

In this instance the take up mechanism may be substantially the same as hereinbefore described and the magazine may be attachable to the top or bottom end of the casing in like manner. Each magazine comprises a rectangular box or housing 42, preferably open at opposite ends, having a projecting guide frame 43 slidable within the guide frame 21 and provided with a closure or slide 44. The opposite open end of the magazine is bounded by a guide frame 45 and a plush lined lip 46, together with a plush edging 47 may be provided for the purpose of securing a light tight joint when the slide 48 is in position as shown in Fig. 10.

The film is reeled upon a suitable spindle or spool 60 provided with the usual slit 61 for attaching the end of the film thereto. This spool is rotatably carried between a pair of separated axle members or pivots, which upon being withdrawn from engagement with the spool 60 will permit the release thereof and hence the discharge of the film. A pulley wheel 49 having the same flexible driving connection 38 with the pulley wheel 33 hereinbefore described, has the squared shank 50 thereof releasably extending into a square hole in the spool 60 for driving the same. Within the hollow extension 51 of the box and impinging against a washer 53 carried by the shank 50 is located a spring 52 which normally forces the pulley inwardly into driving engagement with the spool. The spool is pivoted at the opposite side of the magazine by means of a plunger 57, the end 58 of which is forced into a hole in the spool by means of the spring 59. The pulley 49 may be tapped at 54 to receive the threaded part 55 of the handle 56. The purpose of this handle is to permit the loading of the magazine when used as a feed magazine instead of a take up magazine, as illustrated in my copending application.

In cases where the reeled film must be unloaded from the magazine 42 without exposing it to the light, a container box 62 having a guide frame 63 adapted to be slid over the guideway of the frame 45 may be provided. Thus with the boxes 62 and 42 in position as illustrated in Fig. 13 and the box 42 still attached to the camera casing and the slide 48 withdrawn, it is merely necessary to tilt the camera, withdraw slightly the plunger 47 and pulley 49 against the action of the springs and thereby discharge the reeled film and spool 60 into the container box 62. The latter may then be detached from the magazine 42 after the slide similar to slide 24 has been fitted into guideway 63.

It will be understood that the magazine 42 may be open at one end only if desired, but in such case it will be necessary to detach the magazine before unloading. Furthermore where a cartridge film is used and it is not necessary to exclude the light from the take up magazine, the box 62 may be dispensed with and if desired the magazine 42 open at only one end may be utilized. One of the important features however resides in the self-unloading construction of the magazines, and the fact that the film may be removed from the magazine in the daylight, and merely by tilting the camera and withdrawing slightly the spring pressed pivots from the film spool.

It will be understood that with the present improved attachments it is of course possible to make contact prints from film negatives by retaining the original magazine boxes in place. Also a developed positive film may be projected on a screen merely by removing the spring motor and replacing it with either the crank handle 18 or 56, and attaching an electric lamp to an opening (not shown) in the back of the camera. Furthermore the present improved magazine box may be loaded in daylight and when using a magazine as shown in Figs. 10 to 13 inclusive, the same may be loaded without removing the magazine from the camera as shown and described in my copending application.

It will be understood that by describing in detail herein any particular form, structure, or arrangement, it is not intended to limit the invention beyond the terms of the several claims or the requirements of the prior art.

I claim as my invention:

1. A camera comprising a casing, rotatable means mounted within the casing, a film magazine detachably connected to the outside of the casing and having a rotatable axle, and means connecting said axle to said rotatable means.

2. In a camera the combination of a casing, a pair of film magazines detachably connected to the outside of said casing, and means for feeding the film from one magazine to the other, said casing also having means for supporting reeled films interiorly thereof.

3. In a camera the combination of a casing, a pair of film magazines detachably connected to the outside of the casing, and means for feeding the film from one magazine to the other, said means comprising a power spring.

4. In a camera the combination of a casing, a pair of film magazines detachably connected to the outside of said casing, and means for feeding the film from one magazine to the other, said means including pulley mechanism.

5. In a camera the combination of a casing, a pair of film magazines detachably connected to the outside of said casing, and means for feeding the film from one magazine to the other, said means including a power spring and pulley take up mechanism operated thereby.

6. In a camera the combination of a casing, a feed magazine and a take up magazine detachably connected to the outside of said casing, means for feeding the film from one magazine to the other, said take up magazine having operative connection with said means.

7. In a camera the combination of a casing, a pair of film magazines detachably connected to the outside of the casing, and means for feeding the film from one magazine to the other, said means comprising a power spring, one of said magazines having a driven connection with said power spring.

8. In a camera the combination of a casing, a film magazine detachably connected to the outside thereof, means for conducting the film from the inside of said casing into the magazine, means for releasing the film from said magazine, and means for receiving the film therefrom, said last means having detachable connection to said magazine.

9. In a camera the combination of a casing, a film magazine and a film container, said magazine having a shiftable connection with said casing and said container having a shiftable connection with said magazine.

10. In a camera the combination of a casing, a film magazine detachably connected thereto, and a film container adapted to be detachably connected to said magazine, said casing and magazine when connected having an opening therebetween, and means for closing said opening.

11. In a camera the combination of a casing, a film magazine detachably connected thereto, and a film container adapted to be detachably connected to said magazine, said magazine and container when connected having an opening therebetween and means for closing said opening.

12. In a camera the combination of a casing, a film magazine detachably connected thereto, a film container adapted to be detachably connected to said magazine, said magazine and container when connected having juxtaposed openings, and a pair of shiftable means for closing said openings.

13. In a camera the combination of a casing, a film magazine detachably connected thereto, a film container adapted to be detachably connected to said magazine, said magazine and container when connected having juxtaposed openings, and a pair of slides carried one by the container and one by the magazine for closing said openings.

Signed at New York, N. Y. this 29th day of July, 1922.

HUGO NEWMAN.